United States Patent [19]

Molari, Jr.

[11] Patent Number: 4,544,586
[45] Date of Patent: Oct. 1, 1985

[54] LAMINAR STRUCTURE OF POLYESTER

[75] Inventor: Richard E. Molari, Jr., Pittsfield, Mass.

[73] Assignee: General Electric Company, Pittsfield, Mass.

[21] Appl. No.: 453,558

[22] Filed: Dec. 27, 1982

[51] Int. Cl.[4] .............................................. B44F 1/10
[52] U.S. Cl. ...................................... 428/29; 40/582; 40/612; 40/615; 40/903; 428/323
[58] Field of Search ................ 428/29, 323; 350/105; D10/111, 113, 114; 40/612, 903, 582, 615; 248/466

[56] References Cited

U.S. PATENT DOCUMENTS

| 2,407,680 | 9/1946 | Palmquist | 350/105 |
| 3,953,404 | 4/1976 | Borman | 260/75 M |
| 4,025,674 | 5/1977 | Mizuochi | 428/29 |
| 4,257,937 | 3/1981 | Cohen et al. | 260/40 R |

FOREIGN PATENT DOCUMENTS 0719590 10/1965 Canada ................. 240/195

Primary Examiner—James J. Bell
Attorney, Agent, or Firm—Myron B. Kapustij; William F. Mufatti

[57] ABSTRACT

Laminar structures useful as road signs, markers, informational signs and the like comprised of:
(i) a modified thermoplastic polyester core structure; and
(ii) a front light reflective layer disposed on and laminated to said core structure.

11 Claims, 3 Drawing Figures

LAMINAR STRUCTURE OF POLYESTER

BACKGROUND OF THE INVENTION

Road signs, markers, informational signs, and the like have traditionally been fabricated by cutting or shearing aluminum into blank sizes which are then individually post-coated with reflective materials. This is a costly labor intensive process. Furthermore, the finished aluminum signs are subject to permanent deformation due to bending from vandalsim, accidental causes, high winds and the like.

There thus exists a need for road signs, markers, informational signs and the like which are less costly than the aluminum signs and which are not as prone to the permanent deformation exhibited by aluminum signs. It is an object of the instant invention to provide such signs and markers.

SUMMARY OF THE INVENTION

In accordance with the instant invention there are provided laminar structures, and a method for making said structures, which are useful as road signs, markers, and informational signs, and the like. These laminar structures are comprised of (i) a modified polyester core structure, and (ii) a front lamina which is visible light reflecting disposed on the face of the core structure which faces oncoming traffic.

DESCRIPTION OF THE INVENTION

The instant invention is directed to laminar structures useful in the manufacture of road signs, markers, informational signs, and the like. The invention involves two interrelated and critical requirements, and in order to obtain the improvements exhibited by the laminar structures of the instant invention it is essential to (i) utilize a core structure comprised of at least one modified polyester lamina, and (ii) provide a visible light reflective surface of the front face of the core structure.

Figure 2:
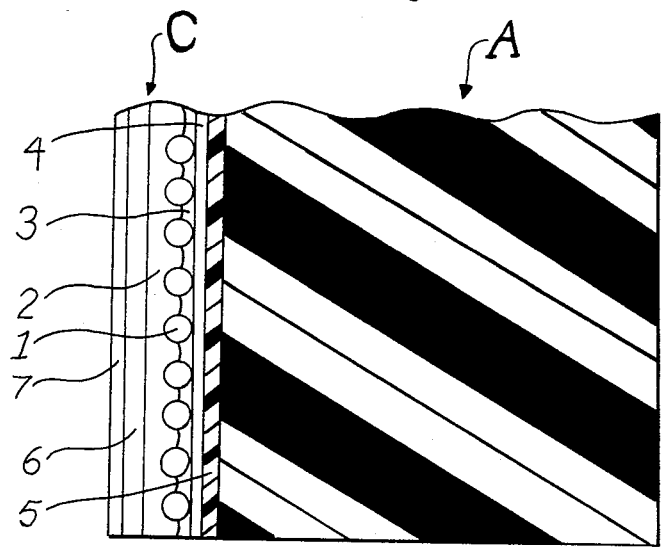
FIG. 2 is a fragmentary vertical section taken through lines 2—2 of the laminar structure shown in FIG. 1.

These two requirements are met by the laminar structure of the instant invention as illustrated in FIG. 2. As shown in FIG. 2 the laminar structure is comprised of an core structure A comprised of at least one lamina of a modified polyester resin. Bonded to the front face, i.e., that face which faces oncoming traffic, of the core structure A is a front laminar structure C which is visible light reflecting.

The core structure A is comprised of at least one lamina or ply. That is to say, the core structure can be monolithic, i.e., containing only one single ply, or it can be comprised of two or more plies bonded or laminated together. The core structure is comprised of a modified thermoplastic composition comprised of:
(a) a polyester comprising:
 (i) a poly(1,4-butylene terephthalate) resin;
 (ii) a blend of a poly(1,4-butylene terephthalate) resin and a poly(ethylene terephthalate) resin;
 (iii) a block copolyester of poly(1,4-butylene terephthalate) and an aromatic/aliphatic or aliphatic polyester;
 (iv) a blend of (iii) and a poly(ethylene terephthalate) resin; or
 (v) a blend of (iii) and a poly(1,4-butylene terephthalate) resin; and
(b) an impact modifier therefor comprising a combination of:
 (i) a polyacrylate resin; and
 (ii) an aromatic polycarbonate resin, in an amount of up to about 60 parts per 100 parts by weight of (a) and (b) together.

This type of modified polyester composition is disclosed in U.S. Pat. No. 4,257,937 to Cohen et al., which is hereby incorporated herein by reference. Generally the polyester resins (a) of the modified polyester compositions are available commercially or can be prepared by known techniques such as by alcoholysis of esters of terephthalic acid with ethylene glycol or butanediol and subsequent polymerization, by heating the glycols with the free acids or with halide derivatives thereof, and similar processes. These are described in U.S. Pat. Nos. 2,465,319 and 3,047,539, and elsewhere. Preparation of the block copolyesters is described in Borman, Dolce and Kramer, U.S. Ser. No. 752,325, filed Dec. 20, 1976.

Illustratively, the high molecular weight polyesters will generally have an intrinsic viscosity of at least about 0.4 deciliters/gram and preferably at least about 0.6 deciliters/gram as measured in a 60:40 phenol/tetrachloride mixture at 30° C.

Also included herein are the branched high melt viscosity poly(1,4-butylene terephthalate) resins, which include a small amount, e.g., up to about 5 mole percent based on the terephthalate units, of a branching component containing at least three ester forming groups. These branched poly(1,4-butylene terephthalate) resins and their preparation are described in Borman, U.S. Pat. No. 3,953,404, which is hereby incorporated herein by reference.

Impact modifier (b) comprises a combination of (i) a polyacrylate resin and (ii) an aromatic polycarbonate resin. The polyacrylate resin (b)(i) can be made in known ways and is available from a number of sources. e.g., Rohm & Haas Company, Philadelphia, under the trade designations Acryloid, KM330 and 7709XP. Other useful polyacrylates are available from Goodyear Tire & Rubber Co. Akron, Ohio, under the trade designation RXL6886; from American Cyanamid Company, Stamford, Ct., under the trade designation Cyanacryl 770; from M & T Chemicals Co., Trenton, N.J., under the trade designation Durostrength 200; and from Polysar Corporation, Canada, under the trade designation Polysar S-1006. In general any of the polyalkyl acrylates described in Brinkman et al. U.S. Pat. No. 3,591,659, which is hereby incorporated herein by reference, can be used, especially those containing units derived from n-butyl acrylate. Preferably, the polyacrylate resin will be in the form of a rubber-elastic graft copolymer having a glass transition temperature below 20° C. as described in Schlichting et al. U.S. Pat. No. 4,022,748, hereby incorporated herein by reference. Especially preferably, the polyacrylate will comprise a multiple stage polymer having a rubbery first stage and a thermoplastic hard final stage, as described in Farnham et al., U.S. Pat. No. 4,096,202, which is hereby incorporated herein by reference. The polycarbonate resins (b)(ii) can be made in known ways, as for example by the reaction of a dihydric phenol, such as bisphenol-A, with a carbonate precursor, such as phosgene, and are commercially available from many sources such as General Electric Company, Pittsfield, Mass. under the trademark LEXAN. The aromatic polycarbonates and methods for their preparation are disclosed in U.S. Pat. Nos. 3,312,659; 3,161,615; 3,220,973; 3,312,660; 3,666,614; 3,989,672 and 4,034,016, all of which are hereby incorporated herein by reference.

The preferred polycarbonate resin is one which is derived from the coreaction of bisphenol-A with a carbonate precursor, preferably phosgene. This preferred polycarbonate resin contains recurring structural units represented by the general formula

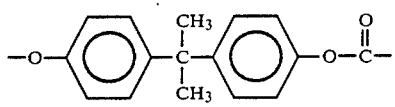

and have a weight average molecular weight in the range of from about 10,000 to about 100,000.

In general, the modifier (b) is present in amounts of at least about 1% by weight, preferably from about 2.5 to about 50% by weight of (a) and (b). The ratio of the polyacrylate to aromatic polycarbonate can vary widely, e.g., within the range of 1 to 99 parts of polyacrylate to polycarbonate to 99 to 1 parts of polyacrylate to polycarbonate. In general, from 60 to 40 parts of polyacrylate are present for each 40 to 60 parts of the aromatic polycarbonate per 100 parts by weight of (b).

These modified polyester compositions can also contain fillers, such as reinforcing fillers such as fibrous (filamentous) glass or mineral fillers such clay, talc, mica and the like. The fillers can be untreated or treated with silane or titinate coupling agents.

These modified polyester compositions can be prepared by a number of procedures. In one method the modifier (b) and any reinforcement fillers, e.g., glass fibers, are put into an extrusion compounder with the polyester resin base (a) to produce molding pellets. The modifier, and filler and/or reinforcement filler, if any, is dispersed in a matrix of the resin in the process. Another method involves mixing the modifier (b) with the polyester resin base (a) by dry blending, then either fluxing on a mill and comminuting, or extruding and chopping. The modifying agent (b) can also be mixed with the polyester resin base and directly molded as, for example, by injection or transfer molding.

The front laminar structure C is a light reflective structure and may be any of the well known and commercially available light reflective structures such as, for example, those described in U.S. Pat. Nos. 3,994,086; 4,226,658; 2,407,680 and 4,025,674, all of which are hereby incorporated herein by reference. One useful type of light reflective laminar structure is that illustrated in FIG. 2. Such a reflex light reflecting structure is disclosed in the aforemention U.S. Pat. No. 2,407,680. Briefly stated, this structure is comprised of an underlying flat back reflector 5 which has a light reflective face. Bonded to the reflective face thereof is a transparent spacing film 4, over which is bonded a transparent binder coating 3 in which a light returning layer of small discrete transparent spheres 1 is partially embedded, so that the back extremities of the spheres touch or closely approach the underlying spacing film and the front extremities project beyond the binder coating. The spacing film and the binder coating constitute a transparent matrix which holds the spheres in fixed position and in definite predetermined uniform spaced relation to the underlying back reflector. Overlying the layer of spheres and binder coating is a transparent solid covering 2 which has a flat front (outer) face and which conforms to the underlying surface of the spheres and binder and is united thereto, thereby sealing in the layer of spheres and excluding atmosphereic contact therewith. The spheres are thus surrounded in front and back by transparent solid material, and the front face of the reflex reflector is flat and not lenticular.

The spheres have a refractive index substantially higher than that of the transparent covering, which is essential to their proper functioning a convex lens elements to cause the necessary bending of incident and emergent light rays which, in combination with the reflective action of the back reflector on the light rays passing through the spheres, results in the desired reflex reflecting chracter of the reflector sheet.

The reflective structure may optionally have a transparent top sheet 6 laminated to the flat front face of the transparent covering 2 which overlies the layer of spheres. In a broad sense, this structure may be regarded as having a flat-front covering for the layer of spheres which is formed in two parts (i.e., layers 2 and 6 together constitute a transparent covering having a flat front face). This construction has the advantage of making it easier to provide a relatively thick total covering for the spheres.

The top sheet 6 may have the same refractive index as the covering layer 2, in which case the optical effect is equivalent to that of increasing the thickness of the covering layer 2. However, top layer 6 may have a different refractive index, either less than or greater than the refractive index of the underlying covering layer 2. This will not affect the refracting action of the spheres. Nor will there be any alteration in the angle with which angularly incident light rays strike the underlying spheres, for they will merely be bent in two steps instead of one step in passing from the atmosphere to the spheres, the end result being the same as though the top sheet 6 was not present.

The covering layer 2 may be chosen with particular reference to its ability to bond to the spheres, and to its reforactive index relative to that of the spheres; whereas these are not factors in selecting the top sheet 6, and the latter may be chosen with particular reference to its weatherability, and to providing a surface especially adapted to receive printing or painting in the making of signs, i.e., layer 7 which represents a layer of print or paint.

It is to be understood that layer 7 need not be the outermost or surface layer in laminar structure C. Thus, for example, layer 7, which contains printing or informational designs, might be placed intermediate layers 2 and 6, intermediate layers 2 and 6, and the like.

Layer 7 may consist of paint, ink or screen-processing by which the appropriate printed information or designs are affixed to the lamina A so as to provide the road signs and markers of the instant invention.

The back reflector 5 may be of any suitable type. It may, for example, be a stiff or rigid base having a reflective surface; a flexible backing (cloth, paper or a film)

having a reflective coating; a metal sheet or foil having a reflective surface (such as aluminum foil); a reflective metal coating deposited on the back surface of the spacing film by electrodeposition or spraying; or a thin binder coating containing a reflective pigment. It may be bonded to the spacing film as the result of any suitable coating or laminating procedure to produce a reflex reflector structure having an integral back reflector. The back reflector need not be of a uniformly reflecting nature over its whole area. It may be formed by printing, stencilling or painting process so that the surface presents desired insignia, designs or lettering, and certain areas may be non-reflective or black. In such cases the lamina C need not contain layer 7.

The spheres 1 may be comprised of transparent solid compositions of suitably high refractive index. In general inorganic types of glass are most useful and can be readily made so as to have a high refractive index.

With respect to sphere size, the upper practical limit is about 50 mils average diameter. The preferred size does not exceed about 10 mils average diameter.

Laminae A and C may be heat bonded together. Alternately, these laminae may be bonded together by means of a suitable adhesive. These adhesive may be pressure sensitive or heat activated. Some non-limiting illustrative examples of suitable adhesives include polyvinylbutyrals, ethylene terpolymers, epoxies, polyurethanes, silicones, acrylics, and ethylene acrylic acids, among others.

Since laminar structure C is generally commercially available it usually has an adhesive layer disposed on one surface thereof. Thus laminar structure C is bonded or laminates to core structure A by means of this predisposed adhesive on C. Thus, for example, one laminar structure C comes from a commercially available source having an adhesive disposed on the back or exposed surface of poly 5. To protect this adhesive there is disposed a paper backing on this adhesive. This paper backing need only be removed before laminar structure C with the preapplied adhesive is ready to be bonded to core structure A.

Thus, lamina C has a preapplied adhesive layer disposed adjacent the outer surface ply 5 and is bonded to lamina A by means of this adhesive layer interposed between ply 5 of lamina C and the surface of lamina A adjacent to and facing ply 5.

While in FIG. 2 the modified polyester core structure A is shown as being comprised of a single monolitic ply, it is to be understood that core structure A may be comprised of two or more modified polyester laminae bonded together by means of a suitable adhesive.

Preferably, the core structure A has a thickness in the range of from about 60 to about 250 mils. In general, if the thickness of the core structure A is less than about 60 mils, the laminar structures of the instant invention do not exhibit sufficient rigidity to perform satisfactorily as a road sign or marker or informational sign, and the like, particularly if it is relatively large, e.g., 12 inches by 18 inches and larger.

If the core structure is less than about 60 mils thick, i.e., from about 30 to about 60 mils thick, it is still possible to utilize the instant laminar structures as road signs, markers, informational signs, and the like. In such instances, however, it is preferred to use these laminar structures in conjunction with appropriate mounting or support devices. These mounting or support devices act to provide stiffening support to the laminar structure and impart thereto the requisite rigidity. Some illustrative non-limiting examples of particularly useful mounting or support devices are disclosed in U.S. Pat. Nos. 3,894,707; 4,066,233; 4,094,487; 4,125,240 and 4,211,381.

Even with laminar structures wherein the core structure A has a thickness greater than about 60 mils it is sometimes desirable, particularly with relatively large signs, to utilize the aforementioned mounting or support devices.

In the case where the laminar structures of the instant invention are to be fully supported, e.g., mounted on a building wall, sign backing, sign support, and the like, the core stucture may have a thickness from about 2 mils to about 30 mils.

The upper thickness range of the core structure A is governed by such secondary considerations as economics, ease of mounting, appearance, and the like.

The instant laminar structure has the advantages of being less expensive than comparable aluminum structures, being resistant to permanent deformation due to vandalsim, accidental causes, high winds, and the like.

Figure 1:
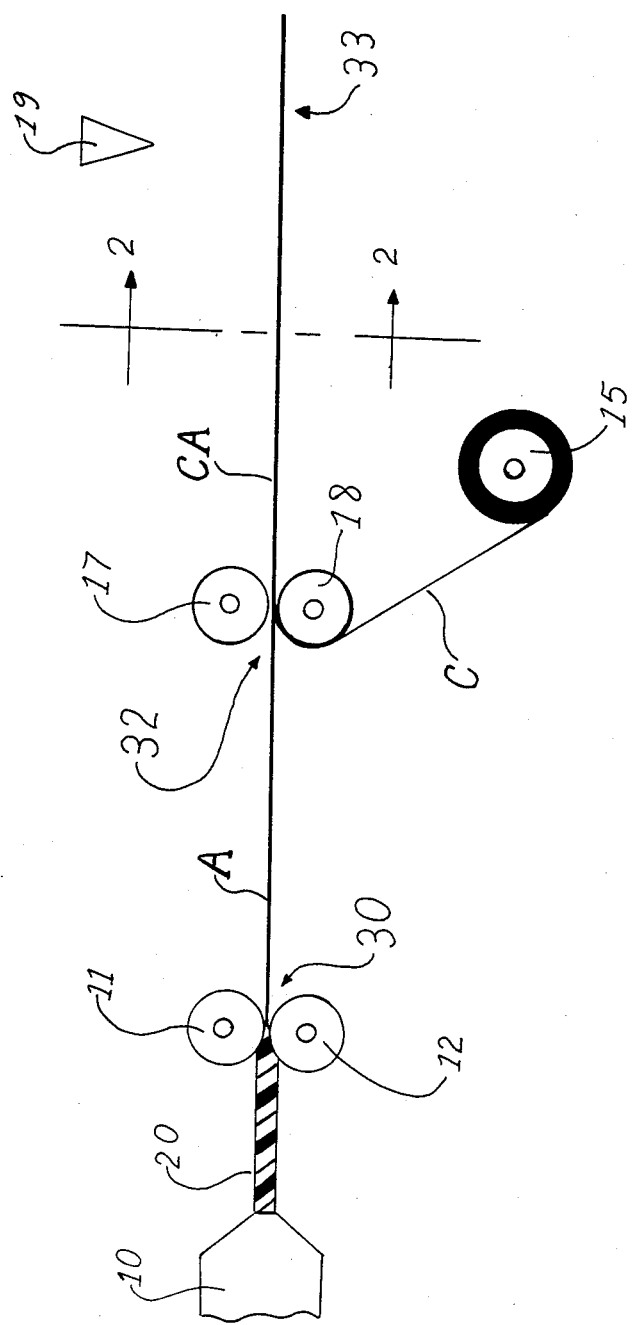
FIG. 1 is a diagramatic view of the apparatus for and method of producing the laminar structures of the instant invention.

One, and the preferred, method of manufacture of the laminar structure illustrated in FIG. 2 is diagramatically illustrated in FIG. 1. The process illustrated in FIG. 1 has the advantage of operating as a total inline process, thereby resulting in reduced costs and labor.

As illustrated in FIG. 1 one or more extruders 10 process the modified polyester resin 20 which is passed to station 30 between polishing rollers 11 and 12 to form a flat sheet of modified polyester resin having a controlled thickness, preferably between about 60 to about 250 mils. This flat sheet A forms the core structure A of the laminar structure illustrated in FIG. 2. A commercially available light reflective composite structure, which is in the form of a film, is mounted on roller 15. At station 32 this commercially available light reflective film C is paased from roller 15 and between rollers 17 and 18 where it is laminated by means of a suitable adhesive which is disposed on the side thereof which is adjacent to and in contact with sheet A to the surface of sheet A. The resulting laminate CA, which is illustrated as the laminar structure of the instant invention in FIG. 2, is then passed to station 33 where it is cut into desired sizes by chopper 19.

The light reflective layer C is disposed on that face of core structure A which faces oncoming traffic so that the light beams of vehicular headlights are reflected by layer C. The exposed surface of core structure A, i.e., that surface opposite the surface on which layer C is disposed, is the mounting surface. That is to say, it is the surface to which the mounting or support means are attached.

Figure 3:
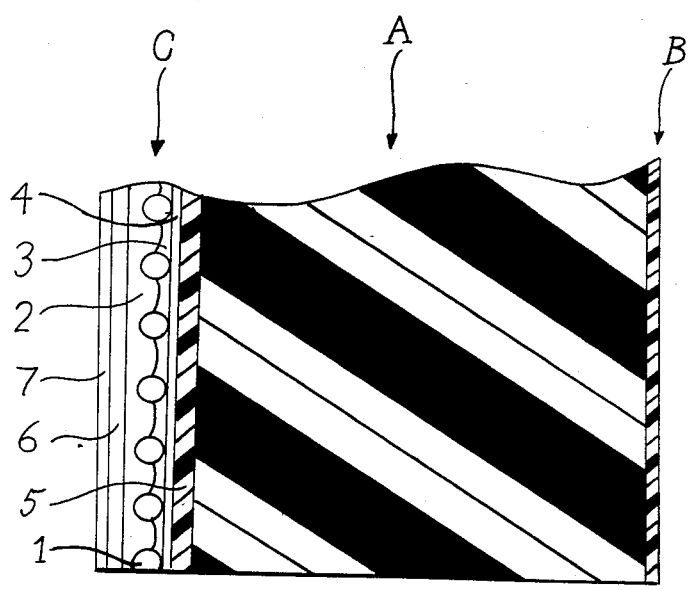
FIG. 3 is a fragmentary vertical section of an optional embodiment of the laminar structure of the instant invention having an ultraviolet radiation protective layer on its reverse face.

In an optional embodiment as illustrated in FIG. 3 the laminar structure of the instant invention may optionally have disposed on said exposed surface of the core structure A, i.e., the face opposite that on which light reflective layer C is disposed, an ultraviolet radiation absorbing or protective back lamina B.

The back lamina B acts to protect the core structure A from the deleterious effects of ultraviolet radiation. The back lamina B must thus be either opaque to ultraviolet radiation or contain an amount of ultraviolet radiation absorbing or stabilizing compounds which effectively prevents transmission of ultraviolet radiation through said lamina B to the underlying core structure A.

The lamina B is generally comprised of a thin film of an organic polymeric material which is compatible with the underlying core structure A, e.g., it does not adversely affect the physical properties such as the impact strength of the modified polyester resin. Some nonlimiting illustrative examples of materials which can be utilized in forming this film include acrylic and methacrylic polymers such as polymethylmethacrylate and polymethacrylate; the organopolysiloxanes; the alpha olefins, e.g., polymers of ethylene, etc.; polyvinyl fluoride; polyvinylidene fluoride; polyesters; polyvinyl acetate: polyacrylamide; polyacrylonitrile and the like.

If the film comprising lamina B is opaque to ultraviolet radiation it will usually contain an amount of pigment, such as for example, titanium dioxide, lamp black, chrome yellow, cadmium selenide red, phthalocyanine blue, phthalocyanine green, and the like, effective to render said film opaque to ultraviolet radiation. Generally, this amount is up to about 25–35% by weight, based on the amount of polymer used in making said film.

If lamina B is non-opaque, it must contain an amount of ultraviolet radiation absorbing or stabilizing compounds effective to prevent transmission of ultraviolet radiation through said film to the underlying core structure A. The amount of ultraviolet radiation absorbers effective to screen out the ultraviolet radiation is to some extent generally dependent upon the material used to produce lamina B and upon the type of ultraviolet radiation absorbing compounds utilized. Generally, however, amounts of ultraviolet radiation absorbers in the range of from about 0.5 to about 25% by weight, based on the amount of polymeric material used in making lamina B, are generally effective in preventing transmission of ultraviolet radiation.

The ultraviolet radiation absorbers employed in the practice of the instant invention can be any of the known organic compounds which function by reason of their ability to screen out the damaging ultraviolet portion of light due to their very high absorptivity in this region of the spectrum. These compounds include but are not limited to the benzophenones, benzophenone derivatives, substituted benzophenone derivatives, benzotriazoles, benzotriazole derivatives, benzoate esters, phenyl salicylates, derivatives of crotonic acid, malonic acid esters, and cyanoacrylates.

Ultraviolet radiation absorbers which fall into the classes of benzophenone derivatives and benzotriazole derivatives include those compounds disclosed in U.S. Pat. Nos. 2,976,259; 3,049,433 and 3,309,220, all of which are hereby incorporated herein by reference. In general, the benzophenone derivatives may be represented by the general formula

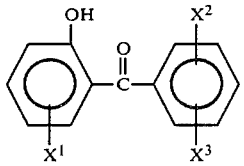

II.

wherein $X^1$, $X^2$ and $X^3$ are independently selected from hydrogen, halogen, alkyl, alkoxy and hydroxyl radicals.

Two non-limiting illustrative examples of derivatives of crotonic acid which function as ultraviolet radiation absorbers are alpha-cyano-beta-(p-methoxypheynl)crotonic acid methyl ester, and alpha-cyano-beta-N-(2-methyl-indolinyl)-crotonic acid methyl ester.

The benzoate ester ultraviolet radiation absorbers include, but are not limited to, the $C_8$–$C_{20}$ alkyl and aryl benzoates, alkyl and aryl hydroxybenzoates, alkaryl and aralkyl benzoates, and alkaryl and aralkyl benzoates.

The malonic acid esters which are effective ultraviolet radiation absorbers include the benzylidene malonates. These benzylidene malonates are represented by the general formula

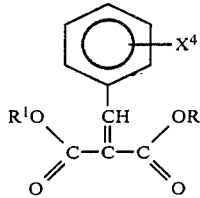

III.

wherein $X^4$ is selected from hydroxyl, halogen, alkyl, hydrogen or alkoxy radicals, and R and $R^1$ are independently selected from alkyl radicals, substituted alkyl radicals, aryl radicals, aralkyl radicals, alkaryl radicals and substituted aryl radicals.

Among the cyanoacrylates which are useful ultraviolet radiation absorbers are those cyanoacrylates represented by the general formula

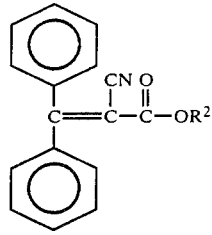

IV.

wherein $R^2$ is alkyl or hydroxyalkyl. These compounds are disclosed in U.S. Pat. No. 4,129,667, which is hereby incorporated herein by reference.

A class of particularly useful ultraviolet radiation stabilizers, particularly when the lamina B is comprised of a polyester, an acrylic resin, or a polymer or copolymer of halo-olefin monomers, are polymers having the general formula

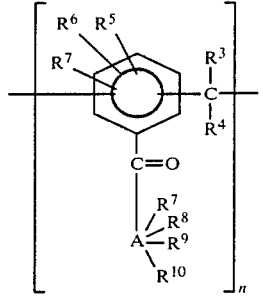

V.

wherein $R^3$ and $R^4$ are selected from the group consisting of hydrogen, alkyl groups having 1 to 6 carbon atoms, chloroalkyl, furyl, vinyl, propenyl and phenyl; $R^5$, $R^6$, $R^7$, $R^8$, $R^9$ and $R^{10}$ are selected from the group consisting of hydrogen, alkyl, alkoxy and halogen; A is an aryl radical; and n is an integer having a value of at least two.

These stabilizing polymers of Formula V are incorporated with the aforementioned polymers in an amount of from about 0.5 to about 5% by weight based on the total weight. Thus, for example, one particularly useful lamina B is a film formed of polyvinyl fluoride containing from 0.5 to about 5% by weight of stabilizing monomer of Formula V. Such compositions are disclosed in U.S. Pat. No. 3,330,884, which is hereby incorporated herein by reference.

Another particularly useful ultraviolet radiation absorber, particularly when lamina B is comprised of alpha olefins and the polar vinylidene monomer based polymers such as polyethylene, polymethylmethacrylate, polymethylacrylate, polyacrylamide, polyvinyl acetate, polyvinylidene fluoride, polyvinyl fluoride, polyvinyl chloride, and polyacrylonitrile, is a polymeric compound having recurring structural units of the formula

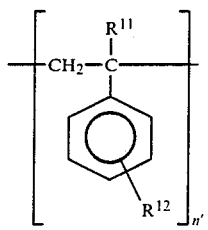

VI.

wherein $R^{11}$ is selected from the group consisting of hydrogen and alkyl; $R^{12}$ is selected from the group consisting of hydrogen, halogen, hydroxy, alkoxy, and alkyl; and n' is a positive integer of from 1 to 3 inclusive; wherein at least one of said units of said polymeric compound have attached to the benzene ring a radical represented by the general formula

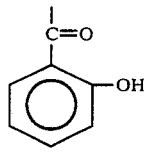

These types of stabilized polymeric systems are disclosed in U.S. Pat. No. 3,418,397, which is hereby incorporated herein by reference.

One particularly useful back lamina B is that marketed by the E. I. DuPont Company under the tradename TEDLAR.

Lamina B is bonded to core structure A by means of a suitable adhesive which may be either pressure sensitive or heat activated. In a preferred embodiment the adhesive is preapplied to the face of lamina B which will be in contact with the core structure A.

DESCRIPTION OF THE PREFERRED EMBODIMENT

In order to more fully and clearly illustrate the present invention the following specific examples are presented. It is intended that the examples be considered as illustrative of rather than limiting the invention disclosed and claimed herein. In the eaxmples all parts and percentages are on a weight basis unless otherwise specified.

A modified polyester composition is prepared by blending together 50 weight % of a polycarbonate resin derived from bisphenol-A and phosgene, 46 weight percent poly(1,4-butylene terephthalate), and 4 weight percent of a polyacrylate rubber (ACRYLOID KM 330, Rohm and Haas Co., U.S. Pat. No. 4,096,202, a multiple stage polymer having a rubbery first stage and a thermoplastic hard final stage). This composition is hereinafter referred to as composition "A".

EXAMPLE 1

This example illustrates the manufacture of the laminar structure of the instant invention.

Pellets of composition A are fed into an extruder operating at about 500° F. and are extruded into sheet. The sheet is then passed between polishing rollers and formed into sheet having a thickness of about 80 mils. To one surface of this 80 mil thick polished sheet is bonded a light reflective film. The light reflective film utilized is one marketed by Avery International under the tradename FASIGN 1500, and is in the form of a realtively thin (about 7 mils thick) visible light reflective sheet. Bonding of this light reflective sheet to the modified polyester sheet is accomplished by bringing into contact with the polyester sheet the pressure sensitive adhesive carrying surface of the light reflective film and passing the polyester sheet and the light reflective film between rollers. The resulting laminar structure is then passed to cutting or chopping means wherein the laminar structure is cut into desired sizes.

Structures produced substantially in accordance with the procedure of Example 1 and having a size of 24 inches by 30 inches were exposed to high winds as follows:

(i) winds of 50 mph at a wind attack angle of 90°;
(ii) winds of 30-35 mph at a wind attack angle of 22.5°.

The structures failed in (i) after 55 minutes and failed in (ii) at 90 minutes. A comparable sized sign formulated from polycarbonate resin failed (ii) after 15 minutes.

The data in Table I demonstrate the difference in permanent deformation caused by bending between the prior art aluminum sheets and the modified polyester sheets of the instant invention. In obtaining the data in Table I 80 mil thick aluminum sheets and 80 mil thick modified polyester sheets as described hereinafore were mounted on tubular sign support members with each sheet having a 15 inch horizontal overhang laterally extending beyond one tubular sign support member. The overhanging portions of each sheet were then bent, in a horizontal direction around the tubular support member, for a certain distance and the permanent deformation noted. The horizontal displacement or bending of the overhanging portions are set forth in inches and degrees in Table I, along with the permanent deformation (in inches) caused by this bending of the aluminum and modified polyester sheets.

TABLE I

| 80 mils thick sheet | Bending Displacement | | Permanent Deformation |
|---|---|---|---|
| | Inches | Degrees | |
| Aluminum | 5 | 20° | 3/16" |
| Aluminum | 7 | 28° | 2" |
| Modified polyester | 15 | 90° | 0" |

The data in Table I show that the modified polyester sheet exhibits no permanent deformation of the overhanging 15" portion after bending to an angle of 90°, while the aluminum is permanently deformed after bending to a much lower degree.

It will thus be seen that the objects set forth above, among those made apparent from the preceding description, are efficiently attained, and since certain changes may be made in carrying out the above process and the structures set forth without departing from the scope of the invention, it is intended that all matters contained in the above description shall be interpreted as illustrative and not in a limiting sense.

What is claimed is:

1. An improved light reflecting sign comprising in combination:
   (i) a core structure having a front face, and
   (ii) a front visible light reflecting layer disposed on the front face of said core structure and bonded thereto by means of a suitable adhesive; the improvement comprising said core structure being comprised of at least one ply containing an impact modified thermoplastic polyester composition comprised of at least one thermoplastic polyester resin selected from
      (a) a poly(1,4-butylene terephthalate) resin,
      (b) a blend of poly(1, 4-butylene terephthalate) resin and a poly(ethylene terephthlate) resin,
      (c) a block copolyester of poly(1,4-butylene terephthalate) and an aromatic/aliphatic polyester,
      (d) a blend of (c) and a poly(1,4-butylene terephthalate) resin, and
      (e) a blend of (c) and a poly(ethylene terephthalate) resin.

2. The sign of claim 1 wherein said impact modified thermoplastic polyester composition contains an impact modifying amount of an impact modifier comprising a combination of:
   (i) a polyacrylate resin; and
   (ii) an aromatic polycarbonate resin.

3. The sign of claim 2 wherein said polyester resin is a poly (1,4- butylene terephthalate resin.

4. The sign of claim 3 wherein said polycarbonate resin is one derived from bisphenol-A and a carbonate precursor.

5. The sign of claim 4 wherein said carbonate precursor is phosgene.

6. The sign of claim 5 wherein said front light reflecting layer is comprised of a light returning layer of small transparent spheres, internal light-reflecting means underlying said spheres and positioned so as to produce reflex reflection, and a continuous overlying transparent solid covering united and conforming to the front extremities of said spheres and having a flat front face.

7. The sign of claim 6 wherein said structure is a road sign or marker.

8. The sign of claim 7 wherein said sign is mounted on a sign support member, with the front of said sign facing oncoming vehicular traffic.

9. The sign of claim 2 which further includes a back lamina or ply disposed on the surface of said core structure opposite that on which said light reflecting layer is disposed, said back lamina being effective in protecting said core structure from ultraviolet radiation.

10. The sign of claim 9 wherein said back lamina is opaque to ultraviolet radiation.

11. The sign of claim 9 wherein said back lamina contains an amount of at least one ultraviolet radiation absorbing compound effective to prevent transmission of a substantial portion of ultraviolet radiation to the underlying core structure.

* * * * *